UNITED STATES PATENT OFFICE 2,652,422

FRACTIONAL ESTERS OF POLYOXYALKYLATED GLYCEROL ETHERS

Melvin De Groote, University City, Mo., assignor to Petrolite Corporation, a corporation of Delaware No Drawing. Application March 5, 1951, Serial No. 214,006

8 Claims. (Cl. 260—475)

The present invention is concerned with certain new chemical products, compounds, or compositions which have useful application in various arts. It includes methods or procedures for manufacturing said new chemical products, compounds or compositions, as well as the products, compounds, or compositions themselves.

Complementary to the above aspect of the invention herein disclosed is my companion invention concerned with the use of these particular chemical compounds, or products, as demulsifying agents in processes or procedures particularly adapted for preventing, breaking, or resolving emulsions of the water-in-oil type, and particularly petroleum emulsions. See my co-pending application, Serial No. 214,005, filed March 5, 1951.

Said new compositions are fractional esters obtained from a polycarboxy acid and a diol obtained by the oxypropylation of a dihydroxy ether of glycerol. This glycerol ether is obtained by reacting one mole of hexyl alcohol, $C_6H_{13}OH$, with one mole of glycide or any comparable procedure which produces the same compound or equivalent isomer thereof.

Various hexyl alcohols are obtained commercially such as methyl amyl alcohol, 2-ethylbutanol, and hexanol. The initial reaction with glycide takes place more rapidly and more satisfactorily with a primary alcohol. For this reason I prefer to use a primary hexyl alcohol as the starting material and particularly to use normal hexanol. These particular alcohols are available from various sources including the Carbide & Carbon Chemicals Corporation, New York city. My preference is to great the glycerol ether of a suitable hexyl alcohol with sufficient propylene oxide so the resulting product is not completely water-soluble, i. e., is at least emulsifiable or insoluble in water and also so the product is no longer completely insoluble in kerosene, i. e., tends to disperse or is soluble in kerosene. The solubility of the hexyl alcohols in water is comparatively limited, for example, from approximately .6 of 1% to less than 2%. However, the ethers obtained from glycerol are distinctly more soluble and are appropriately considered water-soluble in the ordinary sense. Such ether, of course, need not be obtained necessarily by the use of glycide but could be obtained by the use of glycerol monochlorohydrin. The initial alcohols used as satisfactory materials are soluble in kerosene. This solubility is diminished, in fact, practically disappears after conversion into the glycerol ether. Stated another way, the initial glycerol ether is water-soluble to a significant degree and substantially kerosene-insoluble.

In the hereto appended claims reference to the product being water-insoluble means lack of solubility either by being only dispersible, emulsifiable, or rapidly settling out in layers, or for that matter completely insoluble in the usual sense. The intension is to differentiate from an ordinary soluble substance. Similarly, reference in the claims to being at least kerosene-dispersible means that the product will at least disperse or emulsify in kerosene or may be completely soluble in kerosene to give a clear, transparent, homogeneous solution.

As stated, the monohydric alcohol has the following structure:

$$C_6H_{13}OH$$

The glycide derivative is of the following structure:

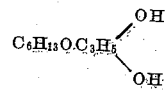

It is this latter compound which is subjected to oxypropylation. If for convenience the latter compound is indicated thus: $HOR'OH$ the product obtained by oxypropylation may be indicated thus:

$$H(OC_3H_6)_nOR'O(C_3H_6O)_{n'}H$$

with the proviso that $n$ and $n'$ represent whole numbers which added together equal a sum varying from 15 to 80, and the acidic ester obtained by reaction of the polycarboxy acid may be indicated thus:

in which the characters have their previous significance, and $n''$ is a whole number not over 2 and R is the radical of the polycarboxy radical

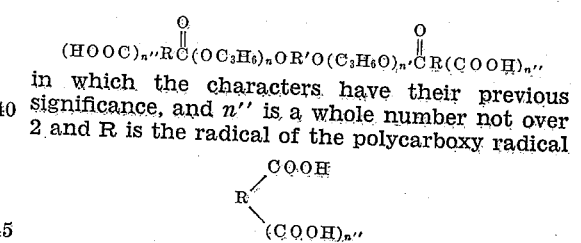

and preferably free from any radicals having more than 8 uninterrupted carbon atoms in a single group, and with the further proviso that the parent diol prior to esterification be preferably water-insoluble or water-dispersible, and kerosene-soluble or kerosene-dispersible.

Attention is directed to the co-pending application of C. M. Blair, Jr., Serial No. 70,811, filed January 13, 1949, in which there is described, among other things, a process for breaking petroleum emulsions of the water-in-oil type characterized by subjecting the emulsion to the action of an esterification product of a dicarboxylic acid and a polyalkylene glycol in which the ratio of equivalents of polybasic acid to equivalents of polyalkylene glycol is in the range of 0.5 to 2.0, in which the alkylene group has from 2 to 3 carbon atoms, and in which the molecular weight of the product is between 1,500 to 4,000.

Similarly, there have been used esters of dicarboxy acids and polypropylene glycols in which 2 moles of the dicarboxy acid ester have been reacted with one mole of a polypropylene glycol having a molecular weight, for example, of 2,000 so as to form an acidic fractional ester. Subsequent examination of what is said herein in comparison with the previous example as well as the hereto appended claims will show the line of delineation between such somewhat comparable compounds. Of greater significance, however, is what is said subsequently in regard to the structure of the parent diol as compared to polypropylene glycols whose molecular weights may vary from 1,000 to 2,000.

Although the herein described products have a number of industrial applications, they are of particular value for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion. This specific application is described and claimed in my co-pending application, Serial No. 214,005 filed March 5, 1951, now Patent 2,602,062, granted July 1, 1952.

The new products are useful as wetting, detergent and leveling agents in the laundry, textile and dyeing industries; as wetting agents and detergents in the acid washing of building stone and brick; as wetting agents and spreaders in the application of asphalt in road building and the like; as a flotation reagent in the flotation separation of various aqueous suspensions containing negatively charged particles, such as sewage, coal washing waste water, and various trade wastes and the like; as germicides, insecticides, emulsifying agents, as, for example, for cosmetics, spray oils, water-repellent textile finishes; as lubricants, etc.

For convenience, what is said hereinafter will be divided into five parts:

Part 1 will be concerned with the preparation of the diol by reacting a hexyl alcohol with glycide or its equivalent;

Part 2 will be concerned with the oxypropylation of the diol obtained in the manner previously described in Part 1;

Part 3 will be concerned with the preparation of esters from the aforementioned oxypropylation derivatives;

Part 4 will be concerned with the structure of the herein described diols and their significance in light of what is said subsequently; and Part 5 will be concerned with certain derivatives which can be obtained from the diols of the type aforementioned:

PART 1

As previously pointed out the monohydric compound is a hexyl alcohol having the formula $C_6H_{13}OH$. However, a variety of isomers may be employed such as $(CH_3)_2CHCH_2CH(OH)CH_3$; $(C_2H_5)_2CHCH_2OH$, or $CH_3(CH_2)_4CH_2OH$. Such compound is then reacted with a suitable reactant such as glycide to give a dihydroxy compound. This reaction may be shown thus:

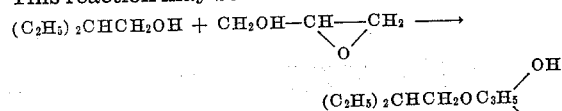

If normal hexanol is used the reaction is, of course, substantially the same except that an isomer is obtained, thus:

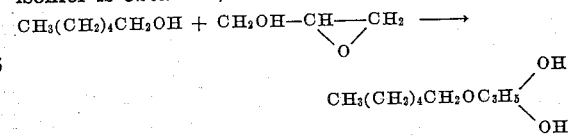

In examining the above reaction it is obvious an isomeric mixture could be obtained for a number of reasons. One need not necessarily employ a single hexyl alcohol but one could employ various isomers as noted, or a mixture of isomers.

Any isomers or mixtures of isomers could then be reacted with glycide and again the epoxy ring could open, depending on the catalyst used, in either one of two ways. Therefore, when reference is made to the dihydroxy compound obtained for convenience from hexyl alcohol by reaction with glycide or the equivalent it is immaterial which isomer is available or whether a mixture of isomers is used.

As far as forming the dihydroxy compound is concerned other reactions can be employed which do not involve glycide; for example, one can product ethers of the kind herein employed by use of a glycerol monochlorohydrin, i. e., either alpha or beta glycerol monochlorohydrin. Attention is directed again to the fact that in the previous formula and in the formulas in the claims it would be immaterial whether the free hydroxyl radicals prior to esterification are present as attached to the first and third terminal carbon atoms, or second and third carbon atoms. This is simply an isomeric difference depending on how the epoxy ring is ruptured in the case of glycide, or whether one employs glycerol alpha monochlorohydrin or glycerol beta monochlorohydrin. Other suitable procedure involves the use of epichlorohydrin in a conventional manner. For instance, the hydroxylated compound can be treated with epichlolohydrin and the resultant product treated with caustic soda so as to reform the epoxy ring. The epoxide so obtained can then be treated with water so as to yield a compound having two hydroxyl radicals attached to two of the three terminally adjacent carbon atoms.

Attention is directed to the fact that the use of glycide requires extreme caution. This is particularly true on any scale other than small laboratory or semi-pilot plant operations. Purely from the standpoint of safety in the handling of glycide, attention is directed to the following: (a) If prepared from glycerol monochlorohydrin, this product should be comparatively pure; (b) the glycide itself should be as pure as possible as the effect of impurities is difficult to evaluate; (c) the glycide should be introduced carefully and precaution should be taken that it reacts as promptly as introduced, i. e., that no excess of glycide is allowed to accumulate; (d) all necessary precaution should be taken that glycide cannot polymerize per se; (e) due to the high boiling point of glycide one can readily employ a typical separatable glass resin pot as described in U. S. Patent No. 2,499,370, dated March 7, 1950, to De Groote and Keiser; and offered for sale by numerous laboratory supply houses. If such arrangement is used to prepare laboratory-scale duplications, then care should be taken that the heating mantle can be removed rapidly so as to allow for cooling; or better still, through an added opening at the top, the glass resin pot or comparable vessel should be equipped with a stainless steel cooling coil so that the pot can be cooled more rapidly than by mere removal of mantle. If a stainless steel coil is introduced it means that the conventional stirrer of the paddle type is changed into the centrifugal type which causes the fluid or reactants to mix due to swirling action in the center of the pot. Still better is the use of a laboratory autoclave of the kind previously described in this Part; but in any event when the initial amount of glycide is added to a suitable reactant, the speed of reaction should be controlled by the usual factors, such as (a) the addition of glycide; (b) the elimination of external heat; and (c) the use of cooling coil so there is no undue rise in temperature. All the foregoing is merely conventional but is included due to the hazard in handling glycide.

*Example 1a*

The equipment used was a glass resin pot of the kind described above. Into this resin pot were charged 5 gram moles of normal hexyl alcohol. This represented 511 grams. To this there was added approximately 1% of sodium methylate equivalent to 6 grams. The temperature of the reaction mass was raised to 121° C. 5 moles of glycide, equivalent to 370 grams, were added slowly over a period of approximately 6 hours at a rate of about 60 grams per hour or slightly less at a gram per minute. Whenever the temperature tended to rise past 131° C. the reaction mass was cooled; if the temperature showed a tendency to drop below 115° C. to 118° C. the reaction mass was heated. When all the glycide had been added the reaction mass was stirred for approximately one hour longer at 135° C., and then was heated to a temperature below the decomposition point of glycide, for instance, 140° C., and held at this temperature for another hour. In this particular reaction there is less hazard than is usually the case insofar that the amount of glycide added was comparatively small and it was added slowly. Even so, such oxyalkylation could be conducted with extreme care. Other catalysts can be employed such as caustic soda, or caustic potash, but purely as a matter of convenience I have employed sodium methylate. The amount of catalyst can be increased but the objection is that more alkaline material must be subsequently removed prior to esterification as described in Part 3, following, or the reaction may take place too rapidly or one might possibly polymerize the glycide itself rather than have it react with the glycol ether.

PART 2

For a number of well known reasons equipment, whether laboratory size, semi-pilot plant size, pilot plant size, or large scale size, is not as a rule designed for a particular alkylene oxide. Invariably and inevitably, however, or particularly in the case of laboratory equipment and pilot plant size the design is such as to use any of the customarily available alkylene oxide, i. e., ethylene oxide, propylene oxide, butylene oxide, glycide, epichlorohydrin, styrene oxide, etc. In the subsequent description of the equipment it becomes obvious that it is adapted for oxyethylation as well as oxypropylation.

Oxypropylations are conducted under a wide variety of conditions, not only in regard to presence or absence of catalyst, and the kind of catalyst, but also in regard to the time of reaction, temperature of reaction, speed of reaction, pressure during reaction, etc. For instance, oxyalkylations can be conducted at temperatures up to approximately 200° C. with pressures in about the same range up to about 200 pounds per square inch. They can be conducted also at temperatures approximating the boiling point of water or slightly above, as for example 95° to 120° C. Under such circumstances the pressure will be less than 30 pounds per square inch unless some special procedure is employed as is sometimes the case, to wit, keeping an atmosphere of inert gas such as nitrogen in the vessel during the reaction. Such low-temperature-low reaction rate oxypropylations have been described very completely in U. S. Patent No. 2,448,664, to H. R. Fife et al., dated September 7, 1948. Low temperature, low pressure oxypropylations are particularly desirable where the compound being subjected to oxypropylation contains one, two or three points of reaction only, such as monohydric alcohols, glycols and triols.

Since low pressure-low temperature reaction speed oxypropylations require considerable time, for instance, 1 to 7 days of 24 hours each to complete the reaction they are conducted as a rule whether on a laboratory scale, pilot plant scale, or large scale, so as to operate automatically. The prior figure of seven days applies especially to large-scale operations. I have used conventional equipment with two added automatic features; (a) a solenoid controlled valve which shuts off the propylene oxide in event that the temperature gets outside a predetermined and set range, for instance, 95° to 120° C., and (b) another solenoid valve which shuts off the propylene oxide (or for that matter ethylene oxide if it is being used) if the pressure gets beyond a predetermined range, such as 25 to 35 pounds. Otherwise, the equipment is substantially the same as is commonly employed for this purpose where the pressure of reaction is higher, speed of reaction is higher, and time of reaction is much shorter. In such instances such automatic controls are not necessarily used.

Thus, in preparing the various examples I have found it particularly advantageous to use laboratory equipment or pilot plant which is designed to permit continuous oxyalkylation whether it be oxypropylation or oxyethylation. With certain obvious changes the equipment can be used also to permit oxyalkylation involving the use of glycide where no pressure is involved except the vapor pressure of a solvent, if any, which may have been used as a diluent.

As previously pointed out the method of using propylene oxide is the same as ethylene oxide. This point is emphasized only for the reason that the apparatus is so designed and constructed as to use either oxide.

The oxypropylation procedure employed in the preparation of the oxyalkylated derivatives has been uniformly the same, particularly in light of the fact that a continuous automatically-controlled procedure was employed. In this procedure the autoclave was a conventional autoclave made of stainless steel and having a capacity of approximately 15 gallons and a working pressure of one thousand pounds gauge pressure. This pressure obviously is far beyond any requirement as far as propylene oxide goes unless there is a reaction of explosive violence involved due to accident. The autoclave was equipped with the conventional devices and openings, such as the variable-speed stirrer operating at speeds from 50 R. P. M. to 500 R. P. M.; thermometer well and thermocouple for mechanical thermometer; emptying outlet, pressure gauge, manual vent line; charge hole for initial reactants; at least one connection for introducing the alkylene oxide, such as propylene oxide or ethylene oxide, to the bottom of the autoclave; along with suitable devices for both cooling and heating the autoclave, such as a cooling jacket, and, preferably, coils in addition thereto, with the jacket so arranged that it is suitable for heating with steam or cooling with water and further equipped with electrical heating devices. Such autoclaves are, of course, in essence small-scale replicas of the usual conventional autoclave used in oxyalkylation procedures. In some instances in exploratory preparations an autoclave having a smaller capacity, for instance, approximately 3½ liters in one case and about 1¾ gallons in another case, was used.

Continuous operation, or substantially continuous operation, was achieved by the use of a separate container to hold the alkylene oxide being employed, particularly propylene oxide. In conjunction with the smaller autoclaves, the container consists essentially of a laboratory bomb having a capacity of about one-half gallon, or somewhat in excess thereof. In some instances a larger bomb was used, to wit, one having a capacity of about one gallon. This bomb was equipped, also, with an inlet for charging, and an eductor tube going to the bottom of the container so as to permit discharging of alkylene oxide in the liquid phase to the autoclave. A bomb having a capacity of about 60 pounds was used in connection with the 15-gallon autoclave. Other conventional equipment consists, of course, of the rupture disc, pressure gauge, sight feed glass, thermometer, connection for nitrogen for pressuring bomb, etc. The bomb was placed on a scale during use. The connections between the bomb and the autoclave were flexible stainless steel hose or tubing so that continuous weighings could be made without breaking or making any connections. This applies also to the nitrogen line, which was used to pressure the bomb reservoir. To the extent that it was required, any other usual conventional procedure or addition which provided greater safety was used, of course, such as safety glass protective screens, etc.

Attention is directed again to what has been said previously in regard to automatic controls which shut off the propylene oxide in event temperature of reaction passes out of the predetermined range or if pressure in the autoclave passes out of predetermined range.

With this particular arrangement practically all oxypropylations become uniform in that the reaction temperature was held within a few degrees of any selected point, for instance, if 105° C. was selected as the operating temperature the maximum point would be at the most 110° C. or 112° C., and the lower point would be 95° or possibly 98° C. Similarly, the pressure was held at approximately 30 pounds within a 5-pound variation one way or the other, but might drop to practically zero, especially where no solvent such as xylene is employed. The speed of reaction was comparatively slow under such conditions as compared with oxyalkylations at 200° C. Numerous reactions were conducted in which the time varied from one day (24 hours) up to three days (72 hours), for completion of the final member of a series. In some instances the reaction may take place in considerably less time, i. e., 24 hours or less, as far as a partial oxypropylation is concerned.

The minimum time recorded was a 4-hour period. Reactions indicated as being complete in four hours or thereabouts may have been complete in a lesser period of time in light of the automatic equipment used. This applies also to larger autoclaves where the reactions were complete in 9 to 12 hours. In the addition of propylene oxide, in the autoclave equipment as far as possible the valves were set so all the propylene oxide was fed in at a rate so the predetermined amount reacted in the first two-thirds of the selected period; for instance, if the selected period was 3 hours the rate was set so the oxide could be fed in in two hours or less. This meant that if the reaction was interrupted automatically for a period of time for the pressure to drop, or the temperature to drop, the predetermined amount of oxide would still be added in most instances well within the predetermined time period. In one experiment the addition of oxide was made over a comparatively long period, i. e., 10 hours. In such instances, of course, the reaction could be speeded up to quite a marked degree.

When operating at a comparatively high temperature, for instance, between 150° to 200° C., an unreacted alkylene oxide such as propylene oxide, makes its presence felt in the increase in pressure or the consistency of a higher pressure. However, at a low enough temperature it may happen that the propylene oxide goes in as a liquid. If so, and if it remains unreacted there is, of course, an inherent danger and appropriate steps must be taken to safeguard against this possibility; if need be a sample must be withdrawn and examined for unreacted propylene oxide. One obvious procedure, of course, is to oxypropylate at a modestly higher temperature, for instance, at 140° to 150° C. Unreacted oxide affects determination of the acetyl or hydroxyl value of the hydroxylated compound obtained.

The higher the molecular weight of the compound, i. e., towards the latter stages of reaction, the longer the time required to add a given amount of oxide. One possible explanation is that the molecule, being larger, the opportunity for random reaction is decreased. Inversely, the lower the molecular weight the faster the reaction takes place. For this reason, sometimes at least, increasing the concentration of the catalyst does not appreciably speed up the reaction, particularly when the product subjected to oxyalkylation has a comparatively high molecular weight. However, as has been pointed out previously, operating at a low pressure and a low temperature even in large scale operations as much as a week or ten days time may elapse to obtain some of the higher molecular weight derivatives from monohydric or dihydric materials.

In a number of operations the counterbalance scale or dial scale holding the propylene oxide bomb was so set that when the predetermined amount of propylene oxide had passed into the reaction the scale movement through a time operating device was set for either one to two hours so that reaction continued for 1½ to 2½ hours after the final addition of the last propylene oxide and thereafter the operation was shut down. This particular device is particularly suitable for use on larger equipment than laboratory size autoclaves, to wit, on semi-pilot plant or pilot plant size, as well as on large scale size. This final stirring period in intended to avoid the presence of unreacted oxide.

In this sort of operation, of course, the temperature range was controlled automatically by either use of cooling water, steam, or electrical heat, so as to raise or lower the temperature. The pressuring of the propylene oxide into the reaction vessel was also automatic insofar that the feed stream was set for a slow continuous run which was shut off in case the pressure passed a predetermined point as previously set out. All the points of design, construction, etc., were conventional including the gauges, check valves and entire equipment. As far as I am aware at least two firms, and possibly three, specialize in autoclave equipment such as I have employed in the laboratory, and are prepared to furnish equipment of this same kind. Similarly pilot plant equipment is available. This point is simply made as a precaution in the direction of safety. Oxyalkylations, particularly involving ethylene oxide, glycide, propylene oxide, etc., should not be conducted except in equipment specifically designed for the purpose.

*Example 1b*

The dihydroxy compound employed was the one previously described which, for purpose of convenience, will be the glycerol ether of hexyl alcohol. The autoclave employed was a small autoclave having a capacity of approximately one gallon. This autoclave was equipped with various automatic devices. In some instances the oxyalkylations were run with automatic controls and in other instances, since the oxypropylation was very short, with manual control. Needless to say, it was immaterial which way the autoclave was handled.

145 grams of the dihydroxylated compound previously described were charged into the autoclave along with 15 grams of caustic soda. It is to be noted that the sodium methylate used in the glycide reaction was permitted to remain in the reaction mass. This meant that the concentration of catalyst was slightly higher than indicated by the amount of caustic soda. The reaction pot was flushed out with nitrogen; the autoclave was sealed and the automatic devices adjusted for injecting 675 grams of propylene oxide in approximately a 2-hour period. The pressure regulator was set for a maximum of 35 pounds per square inch. This meant that the bulk of the reaction could take place, and probably did take place, at a comparatively lower pressure. This comparatively lower pressure was the result of the fact that, at least in part, considerable catalyst was present. The propylene oxide was added at approximately a rate of about 450 grams per hour in this instance. As previously stated, the time required to add all the oxide was 2 hours but this included a short stirring period at the end of the reaction when no actual oxide was entering the apparatus. More important the selected maximum temperature range was 110° C. (moderately above the boiling point of water). The intial introduction of propylene oxide was not started until the heating devices had raised the temperature just a trifle above 100° C. When the reaction was complete approximately one-half of the reaction mass was withdrawn as a sample and the remainder subjected to further oxypropylation as described in Example 2, immediately following.

*Example 2*

417 grams of the reaction mass identified as Example 1b, preceding, were reacted with an additional 402 grams of propylene oxide without adding any catalyst. These 417 grams of reaction mass represented 73 grams of the original hydroxylated material, 337 grams of oxide, and 7 grams of catalyst. The conditions of reaction as far as temperature and pressure were concerned were substantially the same as in Example 1b, preceding. The time required to add the oxide was a little bit longer, that is, 2½ hours, notwithstanding the fact that the amount of oxide added was considerably less. The rate of addition of the oxide was about 200 grams per hour. At the completion of this stage of oxypropylation part of the sample was withdrawn and the remainder subjected to further oxypropylation as described in Example 3b, immediately following.

*Example 3b*

411 grams of the reaction mass identified as Example 3b, preceding, and equivalent to 37 grams of the original dihydroxy material, 370 grams of oxide, and 4 grams of catalyst, were subjected to further oxypropylation with 198 grams of propylene oxide. This was reacted without the use of additional catalyst. The conditions of reaction as far as temperature and pressure were concerned were the same as in Example 2b, preceding, except that the maximum temperature was somewhat higher, i. e., 115° C., instead of 110° C. The time required to add the oxide was considerably longer than previously, to wit, 5½ hours. The addition was made at the rate of about 40 grams per hour. At the completion of the reaction part of the reaction mass was withdrawn and the remainder subjected to the final oxypropylation step as described in Example 4b, immediately following.

*Example 4b*

207 grams of the reaction mass identified as Example 3b, preceding, equivalent to 13 grams of the original dihydroxylated material, 193 grams of oxide, and one gram of catalyst, were subjected to further oxypropylation with 64 grams of propylene oxide. This was reacted without the use of additional catalyst. The maximum pressure was the same as in previous examples, i. e., 35 pounds. The temperature in this instance was somewhat higher than in any of the previous examples, to wit, 125° C. The time required to add the oxide was somewhat longer notwithstanding the smaller amount, i. e., 6 hours. It was added at the rate of about 12½ grams per hour. The above series was duplicated a number of times to give larger amounts for subsequent esterifications.

In the hereto attached tables it will be noted that this series shows theoretical molecular weights varying from 1,000 to 4,000, and hydroxyl molecular weights varying from a little less than 850 to a little less than 1400. In another series of experiments I proceeded further by three additional steps; at a molecular weight corresponding to 5,000 theoretical, the hydroxyl molecular weight was approximately 2150; at 6,000 theoretical molecular weight the hydroxyl value was about 2275, and at 7,000 theoretical molecular weight the hydroxyl value was about 2340. I have esterified these particular oxypropylated derivatives as well as the ones specifically described herein.

What has been said herein is presented in tabular form in Table 1 immediately following, with some added information as to molecular weight and as to solubility of the reaction product in water, xylene and kerosene.

TABLE 1

| Ex. No. | Composition before ||| Composition at end |||| M. W. by hyd. determin. | Max. temp., °C. | Max. pres., lbs. sq. in. | Time, hrs. |
|---|---|---|---|---|---|---|---|---|---|---|---|
| | H. C.¹ amt., grs. | Oxide amt., grs. | Catalyst, grs. | Theo. mol. wt. | H. C.¹ amt., grs. | Oxide amt., grs. | Catalyst, grs. | | | | |
| 1b | 145 | | 15 | 996 | 145 | 675 | 15 | 840 | 110 | 35 | 2 |
| 2b | 73 | 337 | 7 | 1,955 | 73 | 739 | 7 | 1,264 | 110 | 35 | 2½ |
| 3b | 37 | 370 | 4 | 2,875 | 37 | 568 | 4 | 1,390 | 115 | 35 | 5½ |
| 4b | 13 | 193 | 1 | 3,655 | 13 | 257 | 1 | 1,365 | 125 | 35 | 6 |

¹ The hydroxylated compound is the glycerol ether of normal hexyl alcohol.

Example 1b was emulsifiable in water, soluble in xylene and insoluble in kerosene; Example 2b, 3b and 4b were all insoluble in water, but soluble in both xylene and kerosene.

The final product, i. e., at the end of the oxypropylation step, was a somewhat viscous pale amber-colored fluid which was water-insoluble. This is characteristic of all various end products obtained in this series. These products were, of course, slightly alkaline due to the residual caustic soda employed. This would also be the case if sodium methylate were used as a catalyst.

Speaking of insolubility in water or solubility in kerosene such solubility test can be made simply by shaking small amounts of the materials in a test tube with water, for instance, using 1% to 5% approximately based on the amount of water present.

Needless to say, there is no complete conversion of propylene oxide into the desired hydroxylated compounds. This is indicated by the fact that the theoretical molecular weight based on a statistical average is greater than the molecular weight calculated by usual methods on basis of acetyl or hydroxyl value. Actually, there is no completely satisfactory method for determining molecular weights of these types of compounds with a high degree of accuracy when the molecular weights exceed 2,000. In some instances the acetyl value or hydroxyl value serves as satisfactorily as an index to the molecular weight as any other procedure, subject to the above limitations, and especially in the higher molecular weight range. If any difficulty is encountered in the manufacture of the esters as described in Part 3 the stoichiometrical amount of acid or acid compound should be taken which corresponds to the indicated acetyl or hydroxyl value. This matter has been discussed in the literature and is a matter of common knowledge and requires no further elaboration. In fact, it is illustrated by some of the examples appearing in the patent previously mentioned.

PART 3

As previously pointed out the present invention is concerned with acidic esters obtained from the propylated derivatives described in Part 1, immediately preceding, and polycarboxy acids, particularly dicarboxy acids such as adipic acid, phthalic acid, or anhydride, succinic acid, diglycollic acid, sebacic acid, azelaic acid, aconitic acid, maleic acid or anhydride, citraconic acid or anhydride, maleic acid or anhydride adducts as obtained by the Diels-Alder reaction from products such as maleic anhydride, and cyclopentadiene. Such acids should be heat stable so they are not decomposed during esterification. They may contain as many as 36 carbon atoms as, for example, the acids obtained by dimerization of unsaturated fatty acids having 18 carbon atoms. Reference to the acid in the hereto appended claims obviously includes the anhydrides or any other obvious equivalents. My preference, however, is to use polycarboxy acids having not over 8 carbon atoms.

The production of esters including acid esters (fractional esters) from polycarboxy acids and glycols or other hydroxylated compounds is well known. Needless to say, various compounds may be used such as the low molal ester, the anhydride, the acyl chloride, etc. However, for purpose of economy it is customary to use either the acid or the anhydride. A conventional procedure is employed. On a laboratory scale one can employ a resin pot of the kind described in U. S. patent, No. 2,499,370, dated March 7, 1950, to De Groote and Keiser, and particularly with one more opening to permit the use of a porous spreader if hydrochloric acid gas is to be used as a catalyst. Such device or absorption spreader consists of minute alundum thimbles which are connected to a glass tube. One can add a sulfonic acid such as para-toluene sulfonic acid as a catalyst. There is some objection to this because in some instances there is some evidence that this acid catalyst tends to decompose or rearrange heat oxypropylated compounds, and particularly likely to do so if the esterification temperature is too high. In the case of polycarboxy acids such as diglycollic acid, which is strongly acidic there is no need to add any catalyst. The use of hydrochloric gas has one advantage over paratoluene sulfonic acid and that is that at the end of the reaction it can be removed by flushing out with nitrogen, whereas there is no reasonably convenient means available of removing the paratoluene sulfonic acid or other sulfonic acid employed. If hydrochloric acid is employed one need only pass the gas through at an exceedingly slow rate so as to keep the reaction mass acidic. Only a trace of acid need be present. I have employed hydrochloric acid gas or the aqueous acid itself to eliminate the initial basic material. My preference, however, is to use no catalyst whatsoever and to insure complete dryness of the diol as described in the final procedure just preceding of Table 2.

The products obtained in Part 2 preceding may contain a basic catalyst. As a general procedure I have added an amount of half-concentrated hydrochloric acid considerably in excess of what is required to neutralize the residual catalyst. The mixture is shaken thoroughly and allowed to stand overnight. It is then filtered and refluxed with the xylene present until the water can be separated in a phase-separating trap. As soon as the product is substantially free from water the distillation stops. This preliminary step can be carried out in the flask to be used for esterification. If there is any further deposition of sodium chloride during the reflux stage needless to say a second filtration may be required. In any event the neutral or slightly acidic solution of the oxypropylated derivatives described in Part 2 is then diluted further with sufficient xylene decalin, petroleum solvent, or the like, so that one has obtained approximately a 65% solution. To this solution there is added a polycarboxylated reactant as previously described, such as phthalic anhydride, succinic acid or anhydride, diglycollic acid, etc. The mixture is refluxed until esterification is complete as indicated by elimination of water or drop in carboxyl value. Needless to say, if one produces a half-ester from an anhydride such as phthalic anhydride, no water is eliminated. However, if it is obtained from diglycollic acid, for example, water is eliminated. All such procedures are conventional and have been so thoroughly described in the literature that further consideration will be limited to a few examples and a comprehensive table.

Other procedures for eliminating the basic residual catalyst, if any, can be employed. For example, the oxyalkylation can be conducted in absence of a solvent or the solvent removed after oxypropylation. Such oxypropylation end product can then be acidified with just enough concentrated hydrochloric acid to just neutralize the residual basic catalyst. To this product one can then add a small amount of anhydrous sodium sulfate (sufficient in quantity to take up any water that is present) and then subject the mass to centrifugal force so as to eliminate the sodium sulfate and probably the sodium chloride formed. The clear somewhat viscous straw-colored amber liquid so obtained may contain a small amount of sodium sulfate or sodium chloride but, in any event, is perfectly acceptable for esterification in the manner described.

It is to be pointed out that the products here described are not polyesters in the sense that there is a plurality of both diol radicals and acid radicals; the product is characterized by having only one diol radical.

In some instances and, in fact, in many instances I have found that in spite of the dehydration methods employed above that a mere trace of water still comes through and that this mere trace of water certainly interferes with the acetyl or hydroxyl value determination, at least when a number of conventional procedures are used and may retard esterification, particularly where there is no sulfonic acid or hydrochloric acid present as a catalyst. Therefore, I have preferred to use the following procedure: I have employed about 200 grams of the diol as described in Part 1, preceding; I have added about 60 grams of benzene, and then refluxed this mixture in the glass resin pot using a phase-separating trap until the benzene carried out all the water present as water of solution or the equivalent. Ordinarily this refluxing temperature is apt to be in the neighborhood of 130° to possibly 150° C. When all this water or moisture has been removed I also withdraw approximately 20 grams or a little less benzene and then add the required amount of the carboxy reactant and also about 150 grams of a high boiling aromatic petroleum solvent. These solvents are sold by various oil refineries and, as far as solvent effect act as if they were almost completely aromatic in character. Typical distillation data in the particular type I have employed and found very satisfactory is the following:

I. B. P., 142° C.         50 ml., 242° C.
5 ml., 200° C.            55 ml., 244° C.
10 ml., 209° C.           60 ml., 248° C.
15 ml., 215° C.           65 ml., 252° C.
20 ml., 216° C.           70 ml., 252° C.
25 ml., 220° C.           75 ml., 260° C.
30 ml., 225° C.           80 ml. 264° C.
35 ml., 230° C.           85 ml., 270° C.
40 ml., 234° C.           90 ml., 280° C.
45 ml., 237° C.           95 ml., 307° C.

After this material is added, refluxing is continued and, of course, is at a high temperature, to wit, about 160° to 170° C. If the carboxy reactant is an anhydride needless to say no water of reaction appears; if the carboxy reactant is an acid, water of reaction should appear and should be eliminated at the above reaction temperature. If it is not eliminated I simply separate out another 10 or 20 cc. of benzene by means of the phase-separating trap and thus raise the temperature to 180° or 190° C., or even to 200° C., if need be. My preference is not to go above 200° C.

The use of such solvent is extremely satisfactory provided one does not attempt to remove the solvent subsequently except by vacuum distillation and provided there is no objection to a little residue. Actually, when these materials are used for a purpose such as demulsification the solvent might just as well be allowed to remain. If the solvent is to be removed by distillation, and particularly vacuum distillation, then the high boiling aromatic petroleum solvent might well be replaced by some more expensive solvent, such as decalin or an alkylated decalin which has a rather definite or close range boiling point. The removal of the solvent, of course, is purely a conventional procedure and requires no elaboration.

In the appended table Solvent #7-3, which appears in numerous instances, is a mixture of 7 volumes of the aromatic petroleum solvent previously described and 3 volumes of benzene. Reference to Solvent #7 means the particular petroleum solvent previously described in detail.

This was used, or a similar mixture, in the manner previously described. A large number of the examples indicated employing decalin were repeated using this mixture and particularly with the preliminary step of removing all the water. If one does not intend to remove the solvent my preference is to use the petroleum solvent-benzene mixture although obviously any of the other mixtures, such as decalin and xylene, can be employed.

The data included in the subsequent tables, i. e., Tables 2 and 3, are self-explanatory, and very complete and it is believed no further elaboration is necessary:

TABLE 2

| Ex. No. of acid ester | Ex. No. of hydroxy cmpd. | Theo. M. W. of H. C. | Theo. hydroxyl V. of H. C. | Actual hydroxyl value | Mol. wt. based on actual H. V. | Amt. of hyd. cmpd. (grs.) | Polycarboxy reactant | Amt. of polycarboxy reactant (grs.) |
|---|---|---|---|---|---|---|---|---|
| 1c | 1b | 996 | 1,160 | 134 | 840 | 174 | Diglycollic acid | 56.5 |
| 2c | 2b | 1,955 | 57.5 | 89.0 | 1,264 | 232 | do | 48.7 |
| 3c | 3b | 2,875 | 39.2 | 81.0 | 1,390 | 188 | do | 36.5 |
| 4c | 4b | 3,655 | 30.8 | 82.4 | 1,365 | 108 | do | 21.8 |
| 5c | 3b | 2,875 | 39.2 | 81.0 | 1,390 | 188 | Phthalic anhydride | 40.3 |
| 6c | 3b | 2,875 | 39.2 | 81.0 | 1,390 | 188 | Maleic anhydride | 26.7 |
| 7c | 3b | 2,875 | 39.2 | 81.0 | 1,390 | 188 | Succinic anhydride | 27.2 |
| 8c | 4b | 3,655 | 30.8 | 82.4 | 1,365 | 108 | Phthalic anhydride | 24.0 |
| 9c | 4b | 3,655 | 30.8 | 82.4 | 1,365 | 108 | Maleic anhydride | 16.0 |
| 10c | 4b | 3,655 | 30.8 | 82.4 | 1,365 | 108 | Succinic anhydride | 16.3 |
| 11c | 1b | 996 | 1,160 | 134 | 840 | 174 | Phthalic anhydride | 61.5 |
| 12c | 1b | 996 | 1,160 | 134 | 840 | 174 | Maleic anhydride | 41.4 |
| 13c | 1b | 996 | 1,150 | 134 | 840 | 174 | Succinic anhydride | 42.2 |
| 14c | 2b | 1,955 | 57.5 | 89.0 | 1,264 | 232 | Phthalic anhydride | 54.0 |
| 15c | 2b | 1,955 | 57.5 | 89.0 | 1,264 | 232 | Maleic anhydride | 35.7 |
| 16c | 2b | 1,955 | 57.5 | 89.0 | 1,264 | 232 | Succinic anhydride | 36.4 |

TABLE 3

| Ex. No. of acid ester | Solvent | Amt. solvent (grs.) | Esterification temp., °C. | Time of esterification (hrs.) | Water out (cc.) |
|---|---|---|---|---|---|
| 1c | #7-3 | 226 | 152 | 4½ | 7.6 |
| 2c | #7-3 | 274 | 154 | 6 | 7.0 |
| 3c | #7-3 | 222 | 153 | 4½ | 4.9 |
| 4c | #7-3 | 183 | 144 | 6 | 2.9 |
| 5c | #7-3 | 222 | 140 | 2 | |
| 6c | #7-3 | 222 | 142 | 1 | |
| 7c | #7-3 | 222 | 150 | 3 | |
| 8c | #7-3 | 183 | 141 | 2 | |
| 9c | #7-3 | 183 | 143 | 1 | |
| 10c | #7-3 | 183 | 153 | 2½ | |
| 11c | #7-3 | 226 | 142 | 2 | |
| 12c | #7-3 | 226 | 144 | 1½ | |
| 13c | #7-3 | 226 | 143 | 2½ | |
| 14c | #7-3 | 274 | 140 | 2 | |
| 15c | #7-3 | 274 | 142 | 1½ | |
| 16c | #7-3 | 274 | 145 | 2½ | |

The procedure for manufacturing the esters has been illustrated by preceding examples. If for any reason reaction does not take place in a manner that is acceptable, attention should be directed to the following details: (a) Recheck the hydroxyl or acetyl value of the oxypropylated glycerol and use a stoichiometrically equivalent amount of acid; (b) if the reaction does not proceed with reasonable speed either raise the temperature indicated or else extend the period of time up to 12 or 16 hours if need be; (c) if necessary, use ½% of paratoluene sulfonic acid or some other acid as a catalyst; (d) if the esterification does not produce a clear product a check should be made to see if an inorganic salt such as sodium chloride or sodium sulfate is not precipitating out. Such salt should be eliminated, at least for exploration experimentation, and can be removed by filtering. Everything also being equal as the size of the molecule increases and the reactive hydroxyl radical represents a smaller fraction of the entire molecule and thus more difficulty is involved in obtaining complete esterification.

Even under the most carefully controlled conditions of oxypropylation involving comparatively low temperatures and long time of reaction there are formed certain compounds whose composition is still obscure. Such side reaction products can contribute a substantial proportion of the final cogeneric reaction mixture. Various suggestions have been made as to the nature of these compounds, such as being cyclic polymers of propylene oxide, dehydration products with the appearance of a vinyl radical, or isomers of propylene oxide or derivatives thereof, i. e., of an aldehyde, ketone, or allyl alcohol. In some instances an attempt to react the stoichiometric amount of a polycarboxy acid with the oxypropylated derivative results in an excess of the carboxylated reactant for the reason that apparently under conditions of reaction less reactive hydroxyl radicals are present then indicated by the hydroxyl value. Under such circumstances there is simply a residue of the carboxylic reactant which can be removed by filtration or, if desired, the esterification procedure can be repeated using an appropriately reduced ratio of carboxylic reactant.

Even the determination of the hydroxyl value and conventional procedure leaves much to be desired due either to the cogeneric materials previously referred to, or for that matter, the presence of any inorganic salts or propylene oxide. Obviously this oxide should be eliminated.

The solvent employed, if any, can be removed from the finished ester by distillation and particularly vacuum distillation. The final products or liquids are generally light straw to light amber in color, and show moderate viscosity. They can be bleached with bleaching clays, filtering chars, and the like. However, for the purpose of demulsification or the like color is not a factor and decolorization is not justified.

In the above instances I have permitted the solvents to remain present in the final reaction mass. In other instances I have followed the same procedure using decalin or a mixture of decalin or benzene in the same manner and ultimately removed all the solvents by vacuum distillation. Appearances of the final products are much the same as the diols before esterification and in some instances were somewhat darker in color and had a reddish cast and perhaps somewhat more viscous.

PART 4

Previous reference has been made to the fact that diols such as polypropyleneglycol of approximately 2,000 molecular weight, for example, have been esterified with dicarboxy acids and employed as demulsifying agents. On first examination the difference between the herein described products and such comparable products appears to be rather insignificant. In fact, the difference is such that it fails to explain the fact that compounds of the kind herein described may be, and frequently are, 10%, 15% or 20% better on a quantitative basis than the simpler compound previously described, and demulsify faster and give cleaner oil in many instances. The method of making such comparative tests has been described in a booklet entitled "Treating Oil Field Emulsion," used in the Vocational Training Courses, Petroleum Industry Series, of the American Petroleum Institute.

The difference, of course, does not reside in the carboxy acid but in the diol. Momentarily an effort will be made to emphasize certain things in regard to the structure of a polypropylene glycol, such as polypropylene glycol of a 2000 molecular weight. Propylene glycol has a primary alcohol radical and a secondary alcohol radical. In this sense the building unit which forms polypropylene glycols is not symmetrical. Obviously, then, polypropylene glycols can be obtained, at least theoretically, in which two secondary alcohol groups are united or a secondary alcohol group is united to a primary alcohol group, etherization being involved, of course, in each instance.

Usually no effort is made to differentiate between oxypropylation taking place, for example, at the primary alcohol unit radical or the secondary alcohol radical. Actually, when such products are obtained, such as a high molal polypropylene glycol or the products obtained in the manner herein described one does not obtain a single derivative such as $HO(RO)_nH$ in which $n$ has one and only one value, for instance, 14, 15 or 16, or the like. Rather, one obtains a cogeneric mixture of closely related or touching homologues. These materials invariably have high molecular weights and cannot be separated from one another by any known procedure without decomposition. The properties of such mixture represent the contribution of the various individual members of the mixture. On a statistical basis, of course, $n$ can be appropriately specified. For practical purposes one need only consider the oxypropylation of a monohydric alcohol because in essence this is substantially the mechanism involved. Even in such instances where one is concerned with a monohydric reactant one cannot draw a single formula and say that by following such procedure one can readily obtain 80% or 90% or 100% of such compound. However, in the case of at least monohydric initial reactants one can readily draw the formulas of a large number of compounds which appear in some of the probable mixtures or can be prepared as components and mixtures which are manufactured conventionally.

Simply by way of illustration reference is made to the copending application of De Groote, Wirtel and Pettingill, Serial No. 109,791, filed August 11, 1949.

However, momentarily referring again to a monohydric initial reactant it is obvious that if one selects any such simple hydroxylated compound and subjects such compound to oxyalkylation, such as oxyethylation, or oxypropylation, it becomes obvious that one is really producing a polymer of the alkylene oxides except for the terminal group. This is particularly true where the amount of oxide added is comparatively large, for instance, 10, 20, 30, 40, or 50 units. If such compound is subjected to oxyethylation so as to introduce 30 units of ethylene oxide, it is well known that one does not obtain a single constituent which, for the sake of convenience, may be indicated as $RO(C_2H_4O)_{30}OH$. Instead, one obtains a cogeneric mixture of closely related homologues, in which the formula may be shown as the following, $RO(C_2H_4O)_nH$, wherein $n$, as far as the statistical average goes, is 30, but the individual members present in significant amount may vary from instances where $n$ has a value of 25, and perhaps less, to a point where $n$ may represent 35 or more. Such mixture is, as stated, a cogeneric closely related series of touching homologous compounds. Considerable investigation has been made in regard to the distribution curves for linear polymers. Attention is directed to the article entitled "Fundamental Principles of Condensation Polymerization," by Flory, which appeared in Chemical Reviews, volume 39, No. 1, page 137.

Unfortunately, as has been pointed out by Flory and other investigators, there is no satisfactory method, based on either experimental or mathematical examination, of indicating the exact proportion of the various members of touching homologous series which appear in cogeneric condensation products of the kind described. This means that from the practical standpoint, i. e., the ability to describe how to make the product under consideration and how to repeat such production time after time without difficulty, it is necessary to resort to some other method of description, or else consider the value of $n$, in formulas such as those which have appeared previously and which appear in the claims, as representing both individual constituents in which $n$ has a single definite value, and also with the understanding that $n$ represents the average statistical value based on the assumption of completeness of reaction.

This may be illustrated as follows: Assume that in any particular example the molal ratio of the propylene oxide to the diol is 30 to 1. Actually, one obtains products in which $n$ probably varies from 10 to 20, perhaps even further. The average value, however, is 15, assuming, as previously stated, that the reaction is complete. The product described by the formula is best described also in terms of method of manufacture.

However, in the instant situation it becomes obvious that if an ordinary high molal propyleneglycol is compared to strings of white beads of various lengths, the diols herein employed as intermediates are characterized by the presence of a black bead, i. e., a radical which corresponds to the glycerol ether of a hexyl alcohol, particularly normal hexanol as previously described, i. e., the radical

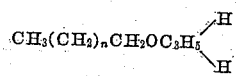

Furthermore, it becomes obvious now that one has a nonsymmetrical radical in the majority of cases for reason that in the cogeneric mixture going back to the original formula

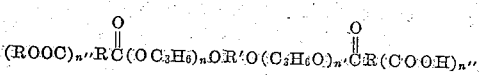

$n$ and $n'$ are usually not equal. For instance, if one introduces 15 moles of propylene oxide, $n$ and $n'$ could not be equal, insofar that the nearest approach to equality is where the value of $n'$ is 7 and $n$ is 8. However, even in the case of an even number such as 20, 30, 40 or 50, it is also obvious that $n$ and $n'$ will not be equal in light of what has been said previously. Both sides of the molecular are not going to grow with equal rapidity, i. e., to the same size. Thus the diol herein employed is differentiated from polypropylene diol 2000, for example, in that (a) it carries a heterogeneous unit, i. e., a unit other than a propylene glycol or propylene oxide unit, (b)

such unit is off center, and (c) the effect of that unit, of course, must have some effect in the range with which the linear molecules can be drawn together by hydrogen binding or van der Waals forces, or whatever else may be involved.

What has been said previously can be emphasized in the following manner. It has been pointed out previously that in the last formula immediately preceding, $n$ or $n'$ could be zero. Under the conditions of manufacture as described in Part 2 it is extremely unlikely that $n$ is ever zero. However, such compounds can be prepared readily with comparatively little difficulty by resorting to a blocking effect or reaction. For instance, if the glycerol ether as previously described is esterified with a low molal acid such as acetic acid mole for mole and such product subjected to oxyalkylation using a catalyst, such as sodium methylate and guarding against the presence of any water, it becomes evident that all the propylene oxide introduced, for instance 15 to 80 molecule per polyhydric alcohol necessarily must enter at one side only. If such product is then saponified so as to decompose the acetic acid ester and then acidified so as to liberate the water-soluble acetic acid and the water-insoluble diol a separation can be made and such diol then subjected to esterification as described in Part 2, preceding. Such esters, of course, actually represent products where either $n$ or $n'$ is zero. Also intermediate procedures can be employed, i. e., following the same esterification step after partial oxypropylation. For instance, one might oxypropylate with one-half the ultimate amount of propylene oxide to be used and then stop the reaction. One could then convert this partial oxypropylated intermediate into an ester by reaction of one mole of acetic acid with one mole of a diol. This ester could then be oxypropylated with all the remaining propylene oxide. The final product so obtained could be saponified and acidified so as to eliminate the water-soluble acetic acid and free the obviously unsymmetrical diol which, incidentally, should also be kerosene-soluble.

From a practical standpoint I have found no advantage in going to this extra step but it does emphasize the difference in structure between the herein described diols employed as intermediates and high molal polypropylene glycol, such as polypropylene glycol 2000.

The most significant fact in this connection is the following. The claims hereto attached are directed to a very specific compound, i. e., one derived by the oxypropylation of the glycerol ether of hexyl alcohol. I have prepared a number of other dihydric compounds which were similar, such as compounds obtained by the treatment of glycol ethers with a mole of glycide. The dihydroxy compounds obtained were then treated with polycarboxy acids in the same manner as herein described in connection with the glycol ether of normal hexanol or the like. Among such glycol ethers employed were the following: Monomethyl ether; ethylene glycol ethylbutyl ether; ethylene glycol monophenyl ether; ethylene glycol monobenzyl ether; diethylene glycol monomethyl ether; diethyleneglycol monoethyl ether; and diethylene glycol monobutyl ether.

I have taken each and every one of these glycol ethers and, as a matter of fact, a large number of ethers, subjected them to reaction with glycide and then oxypropylated the compounds and esterified them in the manner described in the instant application. I have tested all these products for demulsification and at least to date I have not found another analogous compound equally effective for demulsification and also for certain other applications in which surface activity is involved. At the moment, based on this knowledge, this particular compound appears unique for reasons not understood.

PART 5

As pointed out previously the final product obtained is a fractional ester having free carboxyl radicals. Such product can be used as an intermediate for conversion into other derivatives which are effective for various purposes, such as the breaking of petroleum emulsions of the kind herein described. For instance, such product can be neutralized with an amine so as to increase its water-solubility such as triethanolamine, tripropanolamine, oxyethylated triethanolamine, etc. Similarly, such product can be neutralized with amine which tends to reduce the water-solubility such as cyclohexylamine, benzylamine, decylamine, tetradecylamine, octadecylamine, etc. Furthermore, the residual carboxyl radicals can be esterified with alcohol, such as low molal alcohols, methyl, ethyl, propyl, butyl, etc., and also high molal alcohols, such as octyl, decyl, cyclohexanol, benzyl alcohol, octadecyl alcohol, etc. Such products are also valuable for a variety of purposes due to their modified solubility. This is particularly true where surface-active materials are of value and especially in demulsification of water-in-oil emulsions.

Having thus described my invention what I claim as new and desire to secure by Letters Patent, is:

1. Hydrophile synthetic products; said hydrophile synthetic products being characterized by the following formula

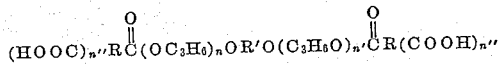

in which R' is the radical of a glycerol ether of a hexyl alcohol; $n$ and $n'$ are integers with the proviso that $n$ and $n'$ equal a sum varying from 15 to 80, and $n''$ is a whole number not over 2, and R is the radical of a polycarboxy acid selected from the group consisting of acyclic and isocyclic polycarboxy acids having not more than 8 carbon atoms and composed of carbon, hydrogen and oxygen of the formula:

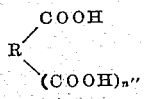

in which $n''$ has its previous significance.

2. Hydrophile synthetic products; said hydrophile synthetic products being characterized by the following formula:

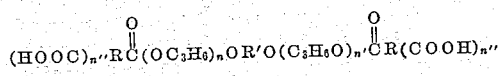

in which R' is the radical of a glycerol ether of a hexyl alcohol, in which the hexyl radical is that of normal hexyl alcohol; $n$ and $n'$ are integers with the proviso that $n$ and $n'$ equal a sum varying from 15 to 80, and $n''$ is a whole number not over 2, and R is the radical of a polycarboxy acid selected from the group consisting of acyclic and isocyclic polycarboxy acids having not more than 8 carbon atoms and composed of carbon, hydrogen and oxygen of the formula:

$$R\begin{matrix}\nearrow COOH\\ \searrow (COOH)_{n''}\end{matrix}$$

in which $n''$ has its previous significance.

3. Hydrophile synthetic products; said hydrophile synthetic products being characterized by the following formula $$(HOOC)R\overset{O}{\overset{\|}{C}}(OC_3H_6)_nOR'O(C_3H_6O)_{n'}\overset{O}{\overset{\|}{C}}R(COOH)$$

in which R' is the radical of a glycerol ether of a hexyl alcohol, in which the hexyl radical is that of normal hexyl alcohol; $n$ and $n'$ are integers with the proviso that $n$ and $n'$ equal a sum varying from 15 to 80, and R is the radical of a dicarboxy acid selected from the group consisting of acyclic and isocyclic dicarboxy acids having not more than 8 carbon atoms and composed of carbon, hydrogen and oxygen of the formula:

$$R\begin{matrix}\nearrow COOH\\ \searrow COOH\end{matrix}$$

4. The product of claim 3 wherein the dicarboxy acid is phthalic acid.

5. The product of claim 3 wherein the dicarboxy acid is maleic acid.

6. The product of claim 3 wherein the dicarboxy acid is succinic acid.

7. The product of claim 3 wherein the dicarboxy acid is citraconic acid.

8. The product of claim 3 wherein the dicarboxy acid is diglycollic acid.

MELVIN DE GROOTE.

No references cited.